(12) United States Patent
Leem et al.

(10) Patent No.: US 11,705,607 B2
(45) Date of Patent: Jul. 18, 2023

(54) METHOD FOR MANUFACTURING BATTERY MODULE FOR ELECTRIC VEHICLE AND BATTERY MODULE MANUFACTURED BY THE METHOD

(71) Applicant: A.F.W. CO., LTD., Chilgok-gun (KR)

(72) Inventors: Young Min Leem, Daegu (KR); Ki Young Kim, Daegu (KR)

(*) Notice: Subject to any disclaimer, the term of this patent is extended or adjusted under 35 U.S.C. 154(b) by 51 days.

(21) Appl. No.: 17/212,118

(22) Filed: Mar. 25, 2021

(65) Prior Publication Data
US 2022/0285796 A1    Sep. 8, 2022

(30) Foreign Application Priority Data

Mar. 3, 2021  (KR) .......... 10-2021-0027999

(51) Int. Cl.
*H01M 50/536*  (2021.01)
*H01M 50/249*  (2021.01)
(Continued)

(52) U.S. Cl.
CPC ....... *H01M 50/536* (2021.01); *H01M 50/211* (2021.01); *H01M 50/249* (2021.01);
(Continued)

(58) Field of Classification Search
CPC ............ H01M 50/536; H01M 50/211; H01M 50/249; H01M 50/503; H01M 50/505; H01M 50/533; H01M 50/534; H01M 50/609; H01M 2220/20; H01M 50/209; H01M 50/516; H01M 50/519; H01M 50/569; H01M 8/04544; H01M 8/04552
See application file for complete search history.

(56) References Cited

U.S. PATENT DOCUMENTS 10,569,356 B1 *  2/2020  Coffey ............... B23K 26/361
2012/0292080 A1   11/2012  Kahl
(Continued)

FOREIGN PATENT DOCUMENTS

CN        112103749 A     12/2020
JP        2014-238938 A   12/2014
(Continued)

OTHER PUBLICATIONS

Kim et al. Oct. 18, 2019, "Manufacturing method of a bus bar", (Machine Translation English version of KR 102034011 B1 ) (See attached) (Year: 2019).*
(Continued)

*Primary Examiner* — Milton I Cano
*Assistant Examiner* — Joshua P McClure
(74) *Attorney, Agent, or Firm* — Antonio Ha & U.S. Patent, LLC (57) ABSTRACT

According to an embodiment, there are provided a method for manufacturing a battery module for an electric vehicle and a battery module manufactured by the method. The method comprises preparing an electrode assembly, the electrode assembly including a plurality of electrode plates, a plurality of electrode tabs, and a separator, forming a plurality of electrode leads by friction-welding a copper piece and an aluminum piece, attaching a sealing film to each of the plurality of electrode leads, packing the electrode assembly in a pouch case, with the aluminum piece exposed to an outside of the pouch case, injecting an electrolyte into the pouch case, sealing the pouch case to form each of the plurality of battery cells, stacking the plurality of battery cells one over another, and connecting the aluminum pieces of the plurality of battery cells to each other via a sensing bus bar.

2 Claims, 7 Drawing Sheets

(51) Int. Cl.
  H01M 50/211 (2021.01)
  H01M 50/534 (2021.01)
  H01M 50/505 (2021.01)
  H01M 50/609 (2021.01)
  H01M 50/503 (2021.01)
  H01M 50/533 (2021.01)

(52) U.S. Cl.
  CPC ....... *H01M 50/503* (2021.01); *H01M 50/505* (2021.01); *H01M 50/533* (2021.01); *H01M 50/534* (2021.01); *H01M 50/609* (2021.01); *H01M 2220/20* (2013.01)

(56) References Cited

U.S. PATENT DOCUMENTS

| 2013/0216878 | A1  | 8/2013 | Merriman et al. | |
|---|---|---|---|---|
| 2015/0224892 | A1* | 8/2015 | Callicoat | G01R 1/0416 29/857 |
| 2018/0062131 | A1* | 3/2018 | Cho | H01M 50/578 |

FOREIGN PATENT DOCUMENTS

| KR | 10-0928975 | 11/2009 |
|---|---|---|
| KR | 10-1198623 | 11/2012 |
| KR | 10-2016-0077762 | 7/2016 |
| KR | 10-2016-0103453 | 9/2016 |
| KR | 102034011 B1 * | 10/2019 |
| KR | 10-2157495 | 9/2020 |

OTHER PUBLICATIONS

Kim et al. Sep. 18, 2020, "Pouch type battery cell and manufacturing method thereof", (Machine Translation English version of KR 102157495 B1) (See attached) (Year: 2019).*
English Specification of 10-2157495.
English Specification of JP2014-238938A.
English Specification of CN112103749A.
English Specification of 10-2016-0077762.
English Specification of 10-2016-0103453.
English Specification of 10-0928975.
English Specification of 10-1198623.

* cited by examiner

METHOD FOR MANUFACTURING BATTERY MODULE FOR ELECTRIC VEHICLE AND BATTERY MODULE MANUFACTURED BY THE METHOD

CROSS-REFERENCE TO RELATED APPLICATION(S)

This application claims priority to Korean Patent Application No. 10-2021-0027999 filed in the Korean Intellectual Property Office on Mar. 3, 2021, the disclosure of which is incorporated by reference herein in its entirety.

TECHNICAL FIELD

Embodiments of the disclosure relates to a method for manufacturing a battery module for an electric vehicle and a battery module for an electric vehicle manufactured by the method, and in particular, to a method for manufacturing a battery module for an electric vehicle to enhance quality and durability and to reduce the weight, and a battery module for an electric vehicle manufactured by the method.

DISCUSSION OF RELATED ART

Secondary batteries are widely used in portable electronic devices in recent years as electronic devices become compact and lightweight thanks to the development of the high-tech electronic industry.

The use of secondary batteries as power sources for electric vehicles and hybrid vehicles is also on the rise to address environmental issues, such as air pollution from conventional gasoline and diesel vehicles.

Typical secondary batteries encompass lithium ion batteries, lithium polymer batteries, nickel cadmium batteries, nickel hydrogen batteries, nickel zinc batteries, etc. The unit secondary battery, i.e., battery cell, with a predetermined voltage may be shaped as a block, cylinder, or pouch. Pouch-type battery cells are slim and light as compared with block or cylinder types and may be made in various shapes. Further, pouch-type battery cells exhibit superior heat dissipation and per-area/volume efficiency and are stackable at multiple layers. Thus, pouch-type battery cell are gaining widespread use.

Secondary batteries are typically manufactured in the form of modules by stacking a plurality of battery cells and connecting them in parallel or series due to the necessity of high-power and large-capacity.

Korean Patent No. 10-0928975 (registered on Nov. 20, 2009) discloses a secondary battery module, which includes package-type battery cells surrounded by thin aluminum plates, tab terminals welded to the plus and minus electrodes of the battery cell and having bends extending upwards and downloads, cell cases that have a concave portion in which the battery cell is inserted and seated and insertion slots in which the bends of the tab terminals are inserted upward and downward, a series connection terminal connecting the tab terminal of the lower battery cell and the tab terminal of the upper battery cell, plus and minus module terminals respectively connected to the upper and lower ends of the stacked battery cells to connect to a device, fixing bolts inserted and installed through the cell cases to tie the stacked cell cases together, a circuit case equipped with a board for measuring and managing the voltage and current of the battery cell seated in each cell case, and a sensing cable connected between the tab terminal of the battery cell and the board of the circuit case to sense the voltage of the battery cell.

Korean Patent No. 10-1198623 (registered on Nov. 1, 2012) discloses a battery module with enhanced assembly, which includes a plurality of battery cells having a receptacle member as an electrical connection means, attached to the plus and minus terminals, a bus bar having a straight connection pin and coupled to the receptacle member fixed to the plus terminal of one battery cell and the receptacle member fixed to the minus terminal of another battery cell, a printed circuit board having a circuit printed thereon to connect the bus bar to a BMS and having an insertion hole through which the connection pin of the bus bar is inserted, a BMS connector for connecting the printed circuit board and the BMS, and a safety cover having the printed circuit board mounted therein, wherein the safety cover covers the high-voltage terminal portion of the battery module and, as the connection pin of the bus bar is inserted through the insertion hole of the printed circuit board, a voltage sensing circuit is formed.

In conventional battery modules for electric vehicles including those described above in the Korean patents, the terminals are formed of aluminum or copper. However, copper is pricey and heavy, which may cause problems with the durability of the product, and aluminum has difficulty in solid soldering, and the soldered parts may be easily corroded by salt water.

SUMMARY

According to embodiments of the disclosure, there are provided a method for manufacturing a battery module for electric vehicles that is lightweight and may exhibit enhanced quality and durability by addressing the foregoing issues with the conventional art and a battery module for electric vehicles, manufactured by the method.

According to an embodiment, there is provided a method for manufacturing a battery module for an electric vehicle. The battery module includes a plurality of battery cells. The method comprises preparing an electrode assembly, the electrode assembly including a plurality of electrode plates, a plurality of electrode tabs, and a separator, forming a plurality of electrode leads by friction-welding a copper piece and an aluminum piece, attaching a sealing film to each of the plurality of electrode leads, packing the electrode assembly in a pouch case, with the aluminum piece exposed to an outside of the pouch case, injecting an electrolyte into the pouch case, sealing the pouch case to form each of the plurality of battery cells, stacking the plurality of battery cells one over another, and connecting the aluminum pieces of the plurality of battery cells to each other via a sensing bus bar.

According to an embodiment, forming the plurality of electrode leads may include friction-welding a side of the copper piece and a side of the aluminum piece, removing beads generated upon the friction-welding, thermally treating the copper piece and the aluminum piece at a predetermined temperature, pressing and forging the copper piece and the aluminum piece, first roll-pressing the copper piece and the aluminum piece, second roll-pressing the copper piece and the aluminum piece, leveling the copper piece and the aluminum piece, and cutting the copper piece and aluminum piece into the plurality of electrode leads.

According to an embodiment, friction-welding the side of the copper piece and the side of the aluminum piece may include mounting the copper piece, which has a rod shape, and the aluminum piece, which has a rod shape, on a friction welding machine, and joining the copper piece and the aluminum piece by rotating the copper piece and the aluminum piece at 1600 rpm to 2200 rpm in opposite directions, with the copper piece and the aluminum piece in tight contact with each other, while pressing the copper piece and the aluminum piece to each other at a force of 7 tons to 20 tons.

According to an embodiment, thermally treating the copper piece and the aluminum piece may include heating the copper piece at a temperature of 300° C. to 400° C. using a first heater and the aluminum piece at a temperature of 200° C. to 300° C. using a second heater.

According to an embodiment, there is provided a battery module for an electric vehicle, manufactured by the method.

According to the embodiments of the disclosure, it is possible to enhance the performance of the battery module and reduce the cost and weight of the battery module by using electrode leads formed by friction-welding a copper piece, which has superior electric conductivity, and an aluminum piece, which is lightweight.

A plurality of battery cells are stacked one over another, and the aluminum pieces of the electrode leads in the battery cells are connected together via a sensing bus bar which is formed of aluminum. Thus, it is possible to increase the connectivity, stability, and durability of the battery module.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Embodiments of the disclosure are now described with reference to the accompanying drawings in such a detailed manner as to be easily practiced by one of ordinary skill in the art. However, the embodiments set forth herein are provided merely for a better understanding of the structure and functions, and the scope of the disclosure should not be limited thereby or thereto. Thus, various changes or modifications may be made to the embodiments and various equivalents thereof may be included in the scope of the disclosure. It should be noted that a specific embodiment of the disclosure need not include all of the objectives or effects set forth herein and the scope of the disclosure should not be limited thereto or thereby.

The terms as used herein may be defined as follows.

The terms "first" and "second" are used to distinguish one component from another, and the scope of the disclosure should not be limited thereby. For example, a first component may be denoted a second component, and vice versa without departing from the scope of the disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween. Other terms or phrases representing the relationship between two or more components, such as 'between' and 'adjacent to,' may be interpreted the same way.

As used herein, the singular forms "a," "an," and "the" are intended to include the plural forms as well, unless the context clearly indicates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined in connection with embodiments of the disclosure, all terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the disclosure are described in detail with reference to the accompanying drawings.

Figure 1:
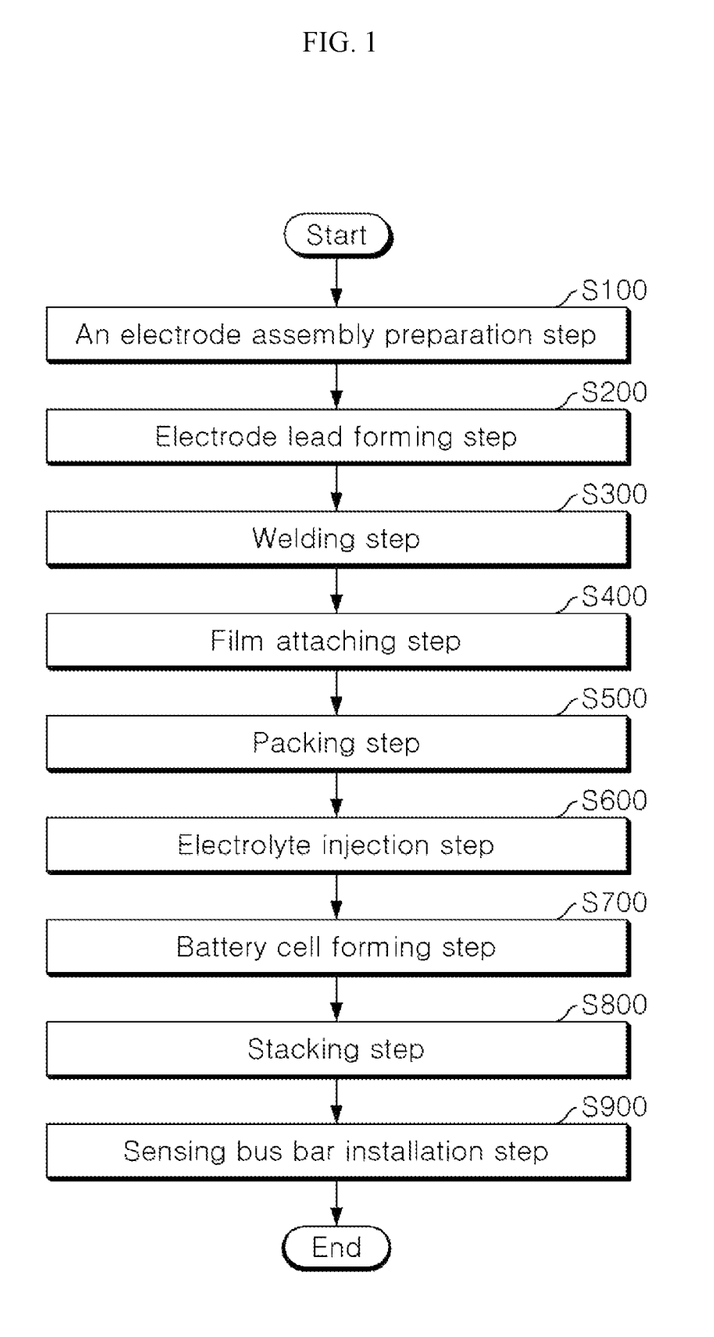
FIG. 1 is a flowchart illustrating a method for manufacturing a battery module for an electric vehicle according to an embodiment.

FIG. 1 is a flowchart illustrating a method for manufacturing a battery module for an electric vehicle according to an embodiment.

Referring to FIG. 1, a method for manufacturing a battery module for an electric vehicle may include an electrode assembly preparation step S100, an electrode lead forming step S200, a welding step S300, a film attaching step S400, a packing step S500, an electrolyte injection step S600, a battery cell forming step S700, a stacking step S800, and a sensing bus bar installation step S900.

In the electrode assembly preparation step S100, an electrode assembly including a plurality of electrode plates 101, a plurality of electrode tabs 102, and a separator (or a separation film or membrane) 103 is prepared.

In an embodiment, the electrode plates 101 may include at least one positive electrode plate and at least one negative electrode plate, and the positive electrode plate and the negative electrode plate may be formed of a thin aluminum plate having a thickness of 10 μm, but are not limited thereto.

According to an embodiment, electrode tabs 102 protrude outward from the electrode plates 101. The electrode tabs 102 may include a positive electrode tab protruding outward from a positive electrode plate and a negative electrode tab protruding outward from a negative electrode plate, and each of which may be connected to an electrode lead of the same polarity.

According to an embodiment, the separator 103 is interposed between the plurality of electrode plates 101 and separates the positive plate and the negative plate from each other.

In other words, the electrode assembly may be configured in a form in which a plurality of positive and negative plates are alternately stacked with the separator interposed therebetween according to an output voltage or charge/discharge capacity required for the battery cell.

In the electrode lead forming step S200, a plurality of electrode leads are formed by friction-welding a copper piece 200 (e.g., a copper rod) and an aluminum piece 300 (e.g., an aluminum rod).

According to an embodiment, the electrode leads may include a positive electrode lead connected to the positive electrode tab and a negative electrode lead connected to the negative electrode tab.

In the welding step S300, the copper piece 200 of the electrode lead formed in the electrode lead forming step S200 is welded to the electrode tab 102 of the electrode assembly prepared in the electrode assembly preparation step S100.

In an embodiment, in the welding step S300, an end of the positive electrode tab and the copper piece 200 of the positive electrode lead may be supplied to come in tight contact with each other, and then, the contacting portions thereof may be laser-welded. In this case, it is preferable that one end of the positive electrode tab and the copper piece 200 of the positive electrode lead are placed to overlap each other, and laser welding may be performed, with the end of the positive electrode tab and the copper piece 200 of the positive electrode lead in contact with each other.

In an embodiment, in the welding step S300, an end of the negative electrode tab and the copper piece 200 of the negative electrode lead may be supplied to come in tight contact with each other, and then, the contacting portions thereof may be laser-welded. In this case, it is preferable that one end of the negative electrode tab and the copper piece 200 of the negative electrode lead are placed to overlap each other, and laser welding may be performed, with the end of the negative electrode tab and the copper piece 200 of the negative electrode lead in contact with each other.

In the film attaching step S400, after the welding step S300, sealing films 400 are attached to the electrode leads.

According to an embodiment, in the film attaching step S400, sealing films 400 are attached to each of the positive electrode lead and the negative electrode lead. For example, sealing films 400 may be placed over and under the positive electrode lead and the negative electrode lead, and be then brought in tight contact with each other and press-fused to wrap around the positive electrode lead and the negative electrode lead. However, embodiments of the disclosure are not limited thereto.

According to an embodiment, in the film attaching step S400, the sealing films 400 may be attached to completely wrap around the copper piece 200 and aluminum piece 300 of the electrode lead which have been joined by friction welding.

Thus, the electrode lead formed by friction-welding the copper and aluminum pieces (or rods) may be prevented from short-circuit or other electrical impacts or corrosion or physical damage due to reaction with the aluminum layer in the pouch case 500.

Figure 2:
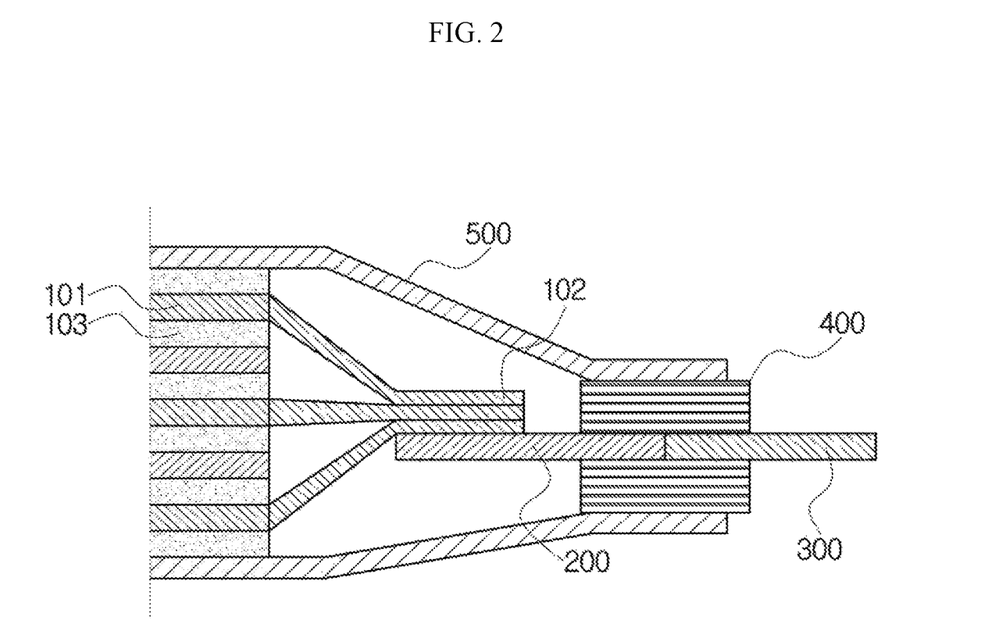
FIG. 2 is a view illustrating a main part of a battery cell manufactured in a battery cell manufacturing step as shown in FIG. 1.

In the packing step S500, the electrode assembly in which the sealing films 400 have been attached in the film attaching step S400 is received in the pouch case 500 to expose the aluminum piece 300 of the electrode lead to the outside of the pouch case 500 as illustrated in FIG. 2.

According to an embodiment, the pouch case 500 may be formed of an aluminum laminated sheet.

In an embodiment, in the packing step S500, after a first pouch film may be formed into a predetermined shape, the electrode assembly is placed on the first pouch film, and then, a second pouch film is placed over the electrode assembly. Then, the first pouch film and the second pouch film are fused together along the edges thereof, receiving the electrode assembly inside the pouch case 500. Upon fusing the first pouch film and the second pouch film, it is preferable that an end of the aluminum piece 300 of the electrode lead is exposed to the outside of the pouch case 500.

In an embodiment, in the packing step S500, one edge of the pouch case 500 may be formed to be open for injection of an electrolyte.

In the electrolyte injection step S600, an electrolyte is injected into the pouch case 500 in which the electrode assembly is received in the packing step S500.

In an embodiment, in the electrolyte injection step S600, the electrolyte may be injected through an open portion in one edge of the pouch case 500.

In the battery cell forming step S700, the pouch case 500 into which the electrolyte has been injected in the electrolyte injection step S600 is sealed, forming a battery cell 600.

Accordingly, all the edges of the pouch case 500 may be completely sealed, so that the electrode assembly received in the pouch case 500 may be fixed, and leakage of the electrolyte from the pouch case 500 may be prevented.

In the stacking step S800, a plurality of battery cells 600 as formed in the battery cell forming step S700 are stacked. Accordingly, it is possible to easily meet the battery specifications required in the electric vehicle.

In the sensing bus bar installation step S900, the aluminum pieces 300 of the electrode leads exposed to the outside from the plurality of battery cells 600 stacked in the stacking step S800 is connected together via a sensing bus bar 700.

Figure 3:
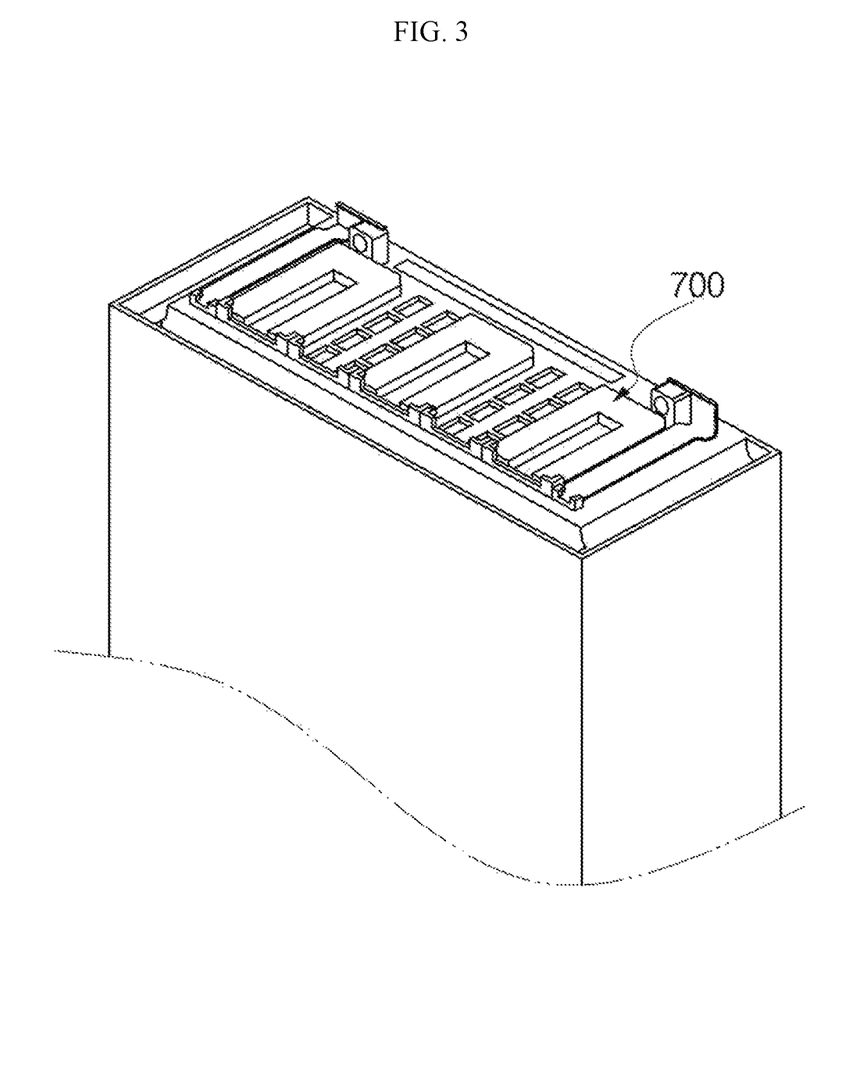
FIG. 3 is a view illustrating a battery module for an electric vehicle manufactured by a method for manufacturing a battery module for an electric vehicle according to an embodiment.

According to an embodiment, the sensing bus bar 700 may be formed of aluminum. The sensing bus bar 700 may be shaped as the letter "U" as illustrated in FIG. 3, but without limitations thereto, it may be formed in other various shapes according to needs, such as a bar shape or a shape with a through-hole in the center thereof.

According to an embodiment, in the sensing bus bar installation step S900, the aluminum piece 300 of the electrode lead protruding outward from any one battery cell 600 and the aluminum piece 300 of the electrode lead protruding outward from another battery cell 600 may be connected together via the sensing bus bar 700, thereby connecting the plurality of battery cells 600 stacked one over another.

In the method for manufacturing a battery module for an electric vehicle having the above-described steps, electrode leads are formed by friction-welding copper pieces 200 and aluminum pieces 300, thus reducing costs and weight while enhancing performance.

In other words, electrode leads are formed by friction-welding the copper piece 200, which is lightweight and superior in electric conductivity, and the aluminum piece 300, which is lightweight, without using nickel which is expensive, thus allowing for high reliability and safety to withstand high output voltage while presenting high output and capacity.

Further, after the plurality of battery cells 600 are stacked, the aluminum pieces 300 of the electrode leads are connected together via the sensing bus bar 700 which is also formed of aluminum, thereby enhancing connectivity and increasing the safety and durability of the battery module.

Figure 4:
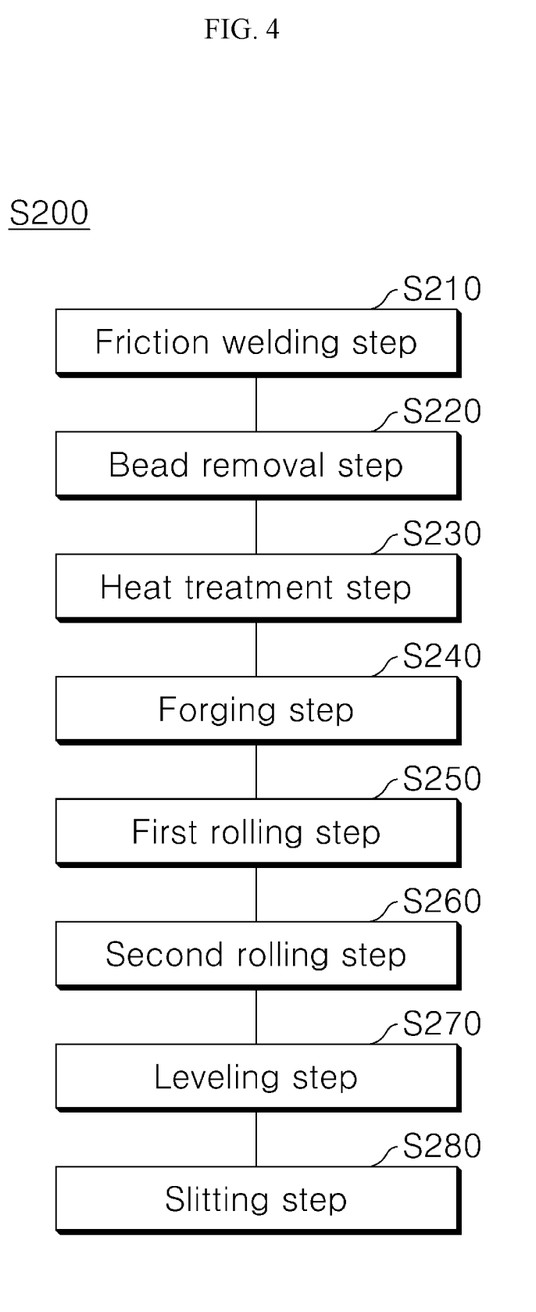
FIG. 4 is a flowchart illustrating an example electrode lead forming step as shown in FIG. 1.

FIG. 4 is a flowchart illustrating an example electrode lead forming step as shown in FIG. 1.

Referring to FIG. 4, the electrode lead forming step S200 may include a friction welding step S210, a bead removal step S220, a heat treatment step S230, a forging step S240, a first rolling step S250), a second rolling step S260, a leveling step S270, and a slitting step S280.

In the friction welding step S210, one side of the copper piece (or rod) 200 and one side of the aluminum piece (or rod) 300 are friction-welded.

According to an embodiment, in the friction welding step S210, the rod-shaped copper piece 200 and the rod-shaped aluminum piece 300, which are mounted on a friction welding machine or equipment, may be rotated in opposite directions at about 1600 rpm to about 2200 rpm, with the respective side surfaces thereof in tight contact with each other while a pressing force in a range from about 7 tons to about 20 tons is applied to the contacting surfaces thereof. As the copper piece 200 and the aluminum piece 300 which rotate in opposite directions are brought in tight contact with each other, a high relative rotational speed which is substantially equal to the sum of the respective rotational speeds of the copper piece 200 and the aluminum piece 300, may be obtained and may be stopped from rotation even without external braking force.

In the bead removal step S220, the welding beads generated in the friction welding portion of the copper piece 200 and aluminum piece 300 joined in the friction welding step S210 are removed.

In an embodiment, in the bead removal step S220, protruding welding beads may be removed using a welding bead processing machine.

In the heat treatment step S230, the copper piece 200 and the aluminum piece 300 from which the welding beads have been removed in the bead raising step S220 are heated to a predetermined temperature (e.g., about 200° C. to about 400° C.).

Figure 5:
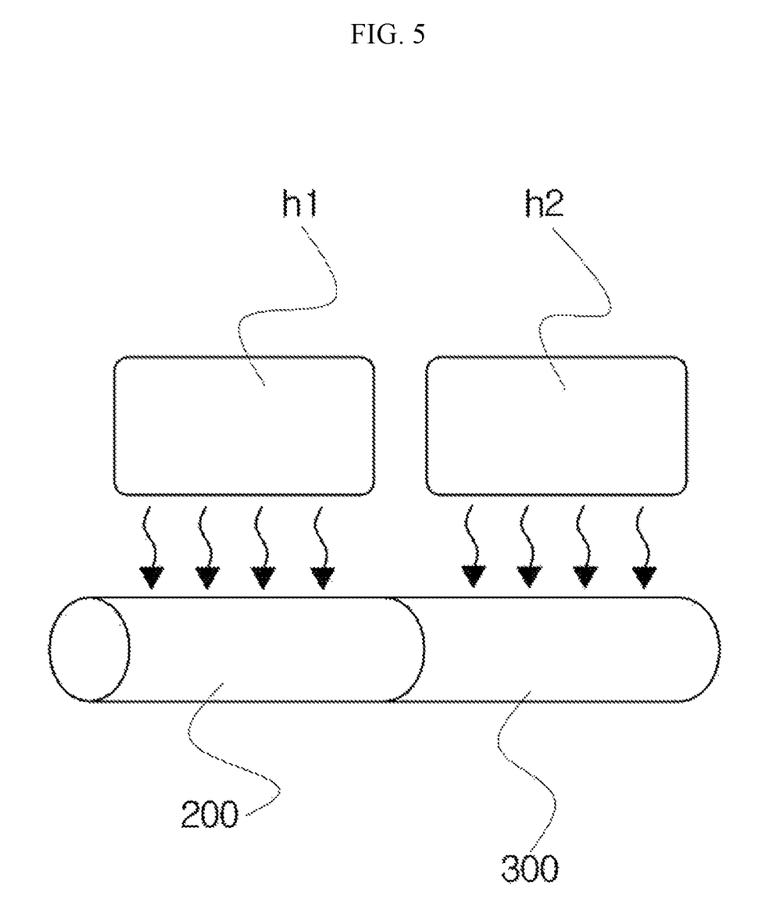
FIG. 5 is a view illustrating a heat treatment step as shown in FIG. 4.

In an embodiment, in the heat treatment step S230, as illustrated in FIG. 5, the copper piece 200 may be heated to at a temperature of 300° C. to 400° C. using a first heater h1, and the aluminum piece 300 may be heated to a temperature of 200° C. to 300° C. using a second heater h2.

As the first heater h1 and the second heater h2, various types of heaters for applying heat to a metallic material, such as an induction heater, may be used.

In the forging step S240, the copper piece 200 and the aluminum piece 300 heat-treated in the heat treatment step S230 are pressed and forged.

In an embodiment, in the forging step S240, the copper piece 200 and the aluminum piece 300 may be pressed into a square bar shape having a predetermined thickness using a forging press.

In the first rolling step S250, the copper piece 200 and aluminum piece 300 forged in the forging step S240 are roll-pressed. The roll pressing may increase the density of the copper piece 200 and the aluminum piece 300 and thus the strength therebetween.

According to an embodiment, in the first rolling step S250, the copper piece 200 and the aluminum piece 300 may be roll-pressed into a plate shape using a first roll press r1.

In the second rolling step S260, the copper piece 200 and aluminum piece 300 roll-pressed in the first rolling step S250 are roll-pressed again.

According to an embodiment, in the second rolling step S260, the copper piece 200 and the aluminum piece 300 may be roll-pressed to have a final, required thickness (e.g., 50 μm to 50000 μm) using a second roll press r2.

In the leveling step S270, the copper piece 200 and the aluminum piece 300 re-roll pressed in the second rolling step S260 are leveled.

According to an embodiment, in the leveling step S270, the copper piece 200 and aluminum piece 300 that have been unevenly flattened by the second roll pressing may be evenly or uniformly flattened using a leveling device.

The leveling device may be a leveling device for alloy plates, that have a plurality of rollers.

In the slitting step S280, the copper piece 200 and the aluminum piece 300 leveled in the leveling step S270 are cut into an electrode lead.

According to an embodiment, in the slitting step S280, the copper piece 200 and aluminum piece 300 may be cut to a predetermined length (e.g., 5 mm to 500 mm), as needed, using a slitting machine.

The melting point of copper is about 1084° C., and the melting point of aluminum is about 660° C., so that the copper piece 200 and the aluminum piece 300 may be formed with a strength higher or lower than a desired strength level when heated at the same temperature. According to the above-described electrode lead forming step, each of the copper piece 200 and the aluminum piece 300 may be heat at a temperature suitable therefor, thus allowing for better formability, and the quality of the product may be enhanced by performing leveling.

Figure 6:
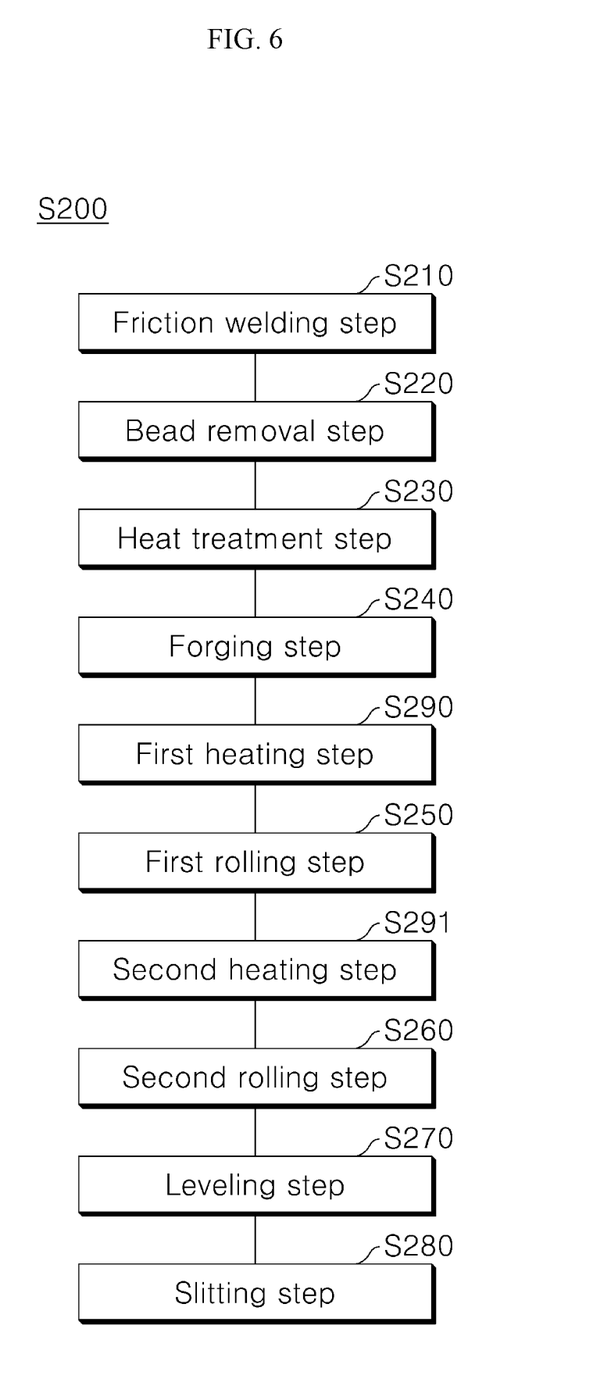
FIG. 6 is a flowchart illustrating an example electrode lead forming step as shown in FIG. 1.

FIG. 6 is a flowchart illustrating an example electrode lead forming step as shown in FIG. 1.

Referring to FIG. 6, the electrode lead forming step S200 may include a friction welding step S210, a bead removal step S220, a heat treatment step S230, a forging step S240, a first heating step S290, a first rolling step S250, a second heating step S291, a second rolling step S260, a leveling step S270, and a slitting step S280. The friction welding step S210, the bead removal step S220, the heat treatment step S230, the forging step S240, the first rolling step S25), the second rolling step S260, the leveling step S270, and the slitting step S280 of FIG. 6 are substantially the same as those of FIG. 4, and no description thereof is thus repeated below.

In the first heat treatment step S290, the copper piece 200 is heated to at a temperature of 300° C. to 400° C. using a third heater h3, and the aluminum piece 300 is heated to a temperature of 200° C. to 300° C. using a fourth heater h4.

Figure 7:
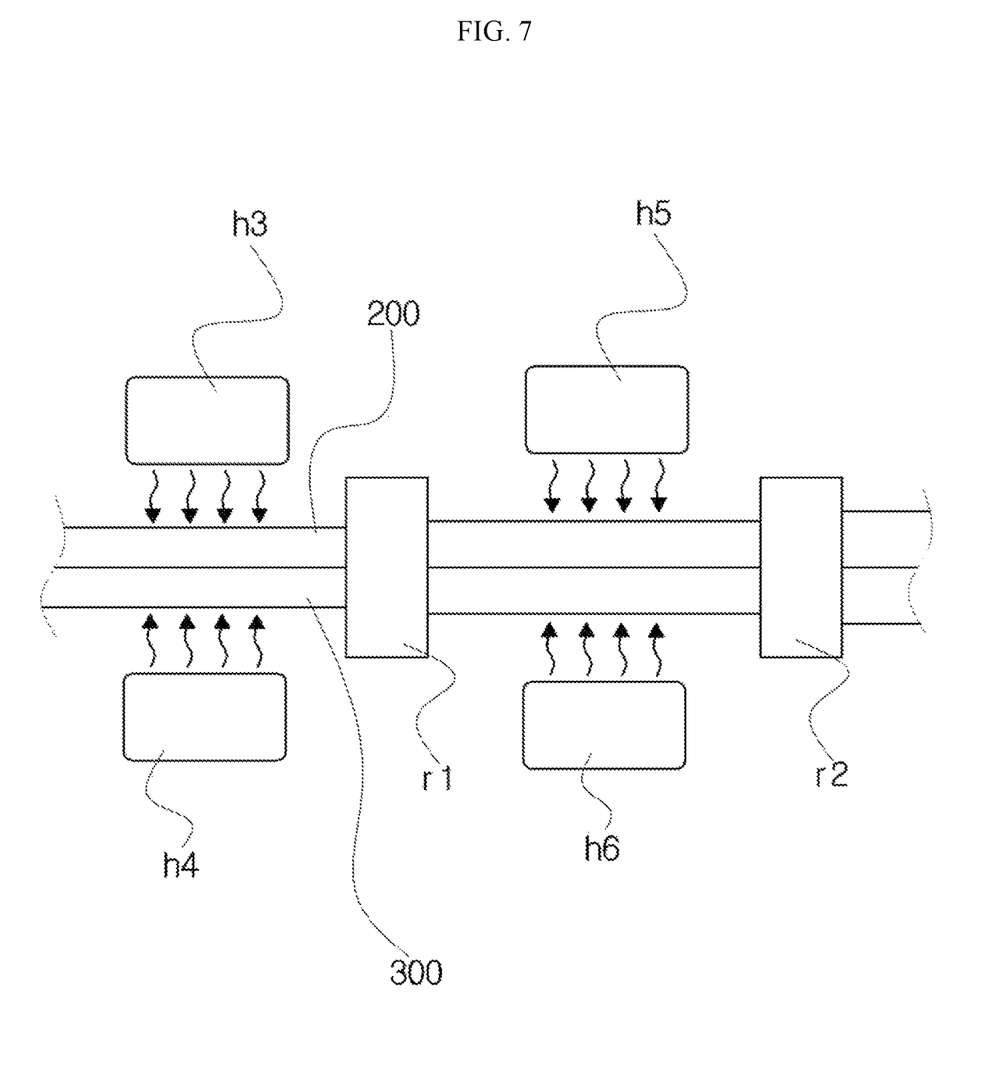
FIG. 7 is a view illustrating a first heating step and a second heating step as shown in FIG. 6.

According to an embodiment, in the first heating step S290, as illustrated in FIG. 7, the third heater h3 may be installed on a side of, or over, the copper piece 200 in the path along which the copper piece 200 and aluminum piece 300 are moved to the first roller press r1 so as to heat and thermally treat the copper piece 200.

According to an embodiment, in the first heating step S290, as illustrated in FIG. 7, the fourth heater h4 may be installed on a side of, or over, the aluminum piece 300 in the path along which the copper piece 200 and aluminum piece 300 are moved to the first roller press r1 so as to heat and thermally treat the aluminum piece 300.

In the second heating step S291, the copper 200 is heated to a temperature of 250° C. to 350° C. using a fifth heater h5, and the aluminum piece 300 is heated to a temperature of 150° C. to 250 using a sixth heater h6.

According to an embodiment, in the second heating step S291, as illustrated in FIG. 7, the fifth heater h5 may be installed on a side of, or over, the copper piece 200 in the path along which the copper piece 200 and aluminum piece 300 are moved to the second roller press r2 so as to heat and thermally treat the copper piece 200.

According to an embodiment, in the second heating step S291, as illustrated in FIG. 7, the sixth heater h6 may be installed on a side of, or over, the aluminum piece 300 in the path along which the copper piece 200 and aluminum piece 300 are moved to the second roller press r2 so as to heat and thermally treat the aluminum piece 300.

By the electrode lead forming step including the above-described sub-steps, the copper piece 200 and aluminum piece 300 may be heated at different temperatures before being roll-pressed, increasing productivity and formability. Further, the copper piece 200 and the aluminum piece 300 may be prevented from weakening in strength as they are heated at a lower temperature in the second heating step S291 than in the first heating step S290.

The embodiments of the disclosure may be implemented by a program or application for implementing the functions of the components of the embodiments, as well as by the above-described apparatus and/or methods, or may also be implemented by a recording medium storing the program. Such implementation may be readily made by one of ordinary skilled in the art from the foregoing description of the embodiments.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A method for manufacturing a battery module for an electric vehicle, the battery module including a plurality of battery cells, the method comprising:
preparing an electrode assembly, the electrode assembly including a plurality of electrode plates, a plurality of electrode tabs, and a separator;
forming a plurality of electrode leads by friction-welding a copper piece and an aluminum piece;
attaching a sealing film to each of the plurality of electrode leads;
packing the electrode assembly in a pouch case, with the aluminum piece exposed to an outside of the pouch case;
injecting an electrolyte into the pouch case;
sealing the pouch case to form each of the plurality of battery cells;
stacking the plurality of battery cells one over another; and
connecting the aluminum pieces of the plurality of battery cells to each other via a sensing bus bar,
wherein forming the plurality of electrode leads includes friction-welding a side of the copper piece and a side of the aluminum piece,
removing beads generated upon the friction-welding,
thermally treating the copper piece at a temperature of 300° C. to 400° C. using a first heater and the aluminum piece at a temperature of 200° C. to 300° C. using a second heater,
pressing and forging the copper piece and the aluminum piece,
first heating the copper piece at a temperature of 300° C. to 400° C. using a third heater and the aluminum piece at a temperature of 200° C. to 300° C. using a fourth heater,
first roll-pressing the copper piece and the aluminum piece,
second heating the copper piece at a temperature of 250° C. to 350° C. using a fifth heater and the aluminum piece at a temperature of 150° C. to 250° C. using a sixth heater,
second roll-pressing the copper piece and the aluminum piece,
leveling the copper piece and the aluminum piece, and
cutting the copper piece and the aluminum piece into the plurality of electrode leads.

2. The method of claim 1, wherein friction-welding the side of the copper piece and the side of the aluminum piece includes mounting the copper piece, which has a rod shape, and the aluminum piece, which has a rod shape, on a friction welding machine, and joining the copper piece and the aluminum piece by rotating the copper piece and the aluminum piece at 1600 rpm to 2200 rpm in opposite directions, with the copper piece and the aluminum piece in tight contact with each other, while pressing the copper piece and the aluminum piece to each other at a force of 7 tons to 20 tons.

* * * * *